United States Patent [19]

Lin et al.

[11] Patent Number: 5,441,811
[45] Date of Patent: Aug. 15, 1995

[54] HIGH TEMPERATURE PRESSURE SENSITIVE ADHESIVES

[75] Inventors: Shaow B. Lin, Schenectady; William E. Cooper, Kinderhook, both of N.Y.

[73] Assignee: General Electric Company, Waterford, N.Y.

[21] Appl. No.: 172,673

[22] Filed: Dec. 22, 1993

Related U.S. Application Data

[63] Continuation of Ser. No. 895,297, Jun. 8, 1992, abandoned.

[51] Int. Cl.$^6$ .................... C08L 83/06; B32B 15/04
[52] U.S. Cl. .................... 428/355; 428/356; 428/447; 524/280; 524/394; 524/398; 524/588
[58] Field of Search .................... 428/355, 356, 447; 524/588, 398, 280, 394

[56] References Cited

U.S. PATENT DOCUMENTS

| | | | |
|---|---|---|---|
| 4,016,328 | 4/1977 | Horning | 428/355 |
| 4,791,163 | 12/1988 | Traver et al. | 524/506 |
| 4,988,779 | 1/1991 | Medford et al. | 525/478 |
| 5,096,981 | 3/1992 | Traver | 525/475 |
| 5,100,976 | 3/1992 | Hamada et al. | 525/477 |

OTHER PUBLICATIONS

Clifford F. Lewis, "Adhesive Films Take on Tougher Jobs", ME, Jan. 1986, pp. 21–25.
Duane F. Merrill, "Silicone Pressure Sensitive Adhesives", The Society for the Advancement of Material and Process Engineering, Jul. 1985.
Frank J. Modic, "Silicon Pressure–Sensitive Adhesives: Their Properties and Applications", Adhesives Age, Dec. 1962, pp. 36–38.

*Primary Examiner*—Melvyn I. Marquis
*Assistant Examiner*—Karen A. Dean

[57] ABSTRACT

Novel silicone pressure sensitive adhesives containing relatively minor amounts of oil- or organic-metal salts are disclosed which exhibit improved high temperature stability properties.

1 Claim, No Drawings

HIGH TEMPERATURE PRESSURE SENSITIVE ADHESIVES

This is a continuation of application Ser. No. 07/895,297 filed on Jun. 8, 1992, now abandoned.

The present invention relates to pressure sensitive adhesive compositions. More particularly, the present invention relates to silicone pressure sensitive adhesives which exhibit excellent high temperature stability. Most particularly, the present invention relates to a silicone pressure sensitive adhesive composition containing relatively minor amounts of oil or organic-soluble metal salts.

BACKGROUND OF THE INVENTION

The term "pressure sensitive adhesive" as used throughout the instant specification refers to adhesives that can be adhered to a surface and yet can be stripped from the surface without transferring more than trace quantities of adhesive to the surface, and can be re-adhered to the same or another surface because the adhesive retains some or all of its tack and adhesive strength.

Pressure sensitive adhesives of the prior art are generally of two generic types. The first type, organic pressure sensitive adhesives, are known in the art to have the requisite physical properties and low cost to make them suitable for a variety of applications. However, the organic pressure sensitive adhesives have been found to be unsuitable for applications requiring adhesion to low energy surfaces, improved weatherability, high low temperature flexibility and good high temperature stability. Thus, organic pressure sensitive adhesives have generally been found to be unsuitable for use in outdoor applications such as outside graphics, automobile striping and for use in bonding plastics where temperature extremes are encountered.

The second type, silicone pressure sensitive adhesives, are also known in the art and are employed in a wide variety of applications, such as pressure sensitive adhesive tapes. The silicone pressure sensitive adhesives exhibit improved weatherability properties over the organic adhesives, such as exhibiting excellent adhesion to very low energy surfaces, flexibility at low temperatures and are chemically stable at high temperatures.

Special mention is made of Traver, U.S. Pat. No. 5,096,981 which discloses that less than 100 parts per million of certain metal salts can be added to a pressure sensitive adhesive comprising a homogeneous mixture of two intermediate pressure sensitive adhesives.

The excellent properties of silicone pressure sensitive adhesives have created an increasing demand for still better adhesives which will withstand the higher operating temperatures of modern equipment and processes. Thus, it would satisfy a long felt need in the art if a silicone pressure sensitive adhesive could be developed which exhibited still further improved high temperature stability over the silicone pressure adhesives of the prior art.

To this end, the present invention provides a novel silicone pressure sensitive adhesive which exhibits improved high temperature stability, passing aging tests at temperatures above 550° F. Such novel silicone pressure sensitive adhesives and their improved high temperature properties are exemplified in the working examples of the present invention.

SUMMARY OF THE PRESENT INVENTION

According to the present invention there is provided a novel silicone pressure sensitive adhesive having improved high temperature stability comprising:
(a) an aromatic hydrocarbon soluble resin copolymer comprising $R_3SiO_{1/2}$ units and $SiO_{4/2}$ units where each R individually represents a monovalent hydrocarbon radical containing no more than six carbon atoms and where the total number of R radicals having olefinic unsaturation is between 0 and 0.5 percent, there being from about 0.6 to about 0.9 $R_3SiO_{1/2}$ units for every $SiO_{4/2}$ unit;
(b) a hydroxyl, vinyl or hydride end-stopped diorganopolysiloxane; and
(c) more than 100 parts per million metal of oil- or organic-soluble metal salts based on the total silicone weight of (a) and (b).

Also according to the present invention there is provided a novel method for improving the high temperature stability of silicone adhesives comprising (i) adding to a silicone adhesive comprising (a) an aromatic hydrocarbon soluble resin copolymer comprising $R_3SiO_{1/2}$ units and $SiO_{4/2}$ units where each R individually represents a monovalent hydrocarbon radical containing no more than six carbon atoms and where the total number of R radicals having olefinic unsaturation is between 0 and 0.5 percent, there being from about 0.6 to about 0.9 $R_3SiO_{1/2}$ units for every $SiO_{4/2}$ unit; and (b) a hydroxyl, vinyl or hydride end-stopped diorganopolysiloxane; (ii) more than 100 parts per million metal of (c) oil- or organic-soluble metal salts based on the total silicone weight of (a) and (b).

Still further, the present invention provides articles of manufacture comprising a silicone pressure sensitive adhesive comprising
(a) an aromatic hydrocarbon soluble resin copolymer comprising $R_3SiO_{1/2}$ units and $SiO_{4/2}$ units where each R individually represents a monovalent hydrocarbon radical containing no more than six carbon atoms and where the total number of R radicals having olefinic unsaturation is between 0 and 0.5 percent, there being from about 0.6 to about 0.9 $R_3SiO_{1/2}$ units for every $SiO_{4/2}$ unit;
(b) a hydroxyl, vinyl or hydride end-stopped diorganopolysiloxane; and
(c) more than 100 parts per million metal of oil- or organic-soluble metal salts based on the total silicone weight of (a) and (b).

DETAILED DESCRIPTION OF THE PRESENT INVENTION

Silicone pressure sensitive adhesives are generally compositions which are based on the combination of a resin (a) and a gum (b).

The resinous component (a) is preferably a resinous copolymer of the MQ type, i.e., comprising units derived from $R_3SiO_{1/2}$ (M units) and $SiO_{4/2}$ (Q units). The R groups in the M units may be identical or different and are monovalent hydrocarbon radicals containing no more than six carbon atoms such as alkyl radicals, e.g., methyl, ethyl and isopropyl; cycloaliphatic radicals, e.g., cyclopentyl and cyclohexenyl; olefinic radicals, e.g., vinyl and allyl; and the phenyl radical. It is preferred that at least 95 percent, and more preferably 100 percent, of all the R radicals in the resinous copolymer are methyl and that essentially all of the radicals are free of olefinic unsaturation. About 0 to up to 0.5 percent of all R radicals in the copolymer can be olefinically unsaturated, such as with the vinyl radical. More preferably, the number of unsaturated R radicals can range from 0 to 0.2 percent of all R radicals in the copolymer.

The Q units of the resinous copolymer are essentially all siloxane units, containing no silicon bonded carbon atoms and are derived from the silica hydrosol used in the preferred method of preparation as described hereinbelow.

Resin copolymers (a) that are operable in the invention are soluble in aromatic hydrocarbon solvents such as benzene, toluene, xylene and the like and have a ratio of M units to Q units of from 0.6:1.0 to 0.9:1.0.

The resinous copolymer (a) can be prepared by any of the known methods for preparing such resins. For example, cohydrolysis of an appropriate amount of each of the silanes of the formula $R_3SiX$ and $SiX_4$ to give M units and Q units in the desired M:Q ratio in the resin copolymer can be used, where X is a hydrolyzable group such as alkoxy. Preferably, the resin copolymer is prepared by the method of Daudt et al., U.S. Pat. No. 2,676,182. Briefly, the method of Daudt et al. comprises reacting under acidic conditions, a silica hydrosol with organo-substituted siloxanes, for example, hexamethyldisiloxane, or hydrolyzable organo-substituted silanes, for example, trimethylchlorosilane, or their mixtures and recovering a resin copolymer having M and Q units which is soluble in aromatic hydrocarbon solvents.

The gum component (b) typically comprises a hydroxyl, vinyl or hydride end-stopped polydiorganosiloxane. Particularly preferred are hydroxyl end-stopped polydiorganosiloxanes having a viscosity of from about 100,000 to about 500,000,000 centipoise, preferably from about 20,000,000 to about 200,000,000 centipoise; and most preferably from about 40,000,000 to about 100,000,000 centipoise. The hydroxyl end-stopped polydiorganosiloxanes useful in the practice of the present invention are generally represented by those of the general formula:

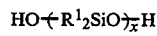

$$HO\text{-}(R^1_2SiO)_{\overline{x}}H$$

wherein each $R^1$ individually is a radical selected from the group consisting of alkyl radicals such as methyl, ethyl, propyl, hexyl and octyl; alkenyl radicals such as vinyl, allyl, propenyl, butenyl and hexenyl; cyclic hydrocarbon radicals such as cyclohexyl and cyclohexenyl; and aryl radicals such as phenyl, 2-phenylethyl, tolyl and benzyl. Methyl, vinyl and phenyl are, in general, the preferred $R^1$ radicals, and the methyl radical preferably accounts for at least 50, more preferably 95, and most preferably 100 percent of all $R^1$ radicals.

A particularly useful polydiorganosiloxane fluid is a silanol-stopped polydimethylsiloxane fluid.

The polydiorganosiloxanes of the present invention can generally be prepared by any of the methods known in the art. For example, the polydiorganosiloxanes can be prepared according to the method disclosed in U.S. Pat. No. 2,814,601 (Currie et al.), wherein an appropriate siloxane is reacted with an aqueous acid in an closed system until the viscosity of the siloxane has become essentially constant. The product is then washed free of the acid.

Components (a) and (b) of the present invention may be combined in a wide variety of proportions in preparing the silicone pressure sensitive adhesives of the present invention. Typically, there is employed component (a) in an amount ranging from about 80 to about 40 parts by weight and component (b) in an amount ranging from about 20 to about 60 parts by weight based on 100 parts by weight of (a) and (b) together. More preferably, there is employed component (a) in an amount ranging from 80 to about 50 parts by weight and component (b) in an amount ranging from about 20 to about 50 parts by weight based on 100 parts by weight of (a) and (b) together.

Essential to the practice of the present invention, the silicone pressure sensitive adhesives further comprise more than 100 parts per million metal of oil- or organic-soluble metal salts based on the total silicone weight of (a) and (b). Addition of 100 parts per million metal or less of the metal salts do not yield the high temperature stable silicone pressure sensitive adhesives of the present invention. In preferred embodiments, the amount of metal salt employed can range from 110 parts per million metal to 2500 parts per million metal based on total silicone weight. Most preferred is where the silicone pressure sensitive adhesive of the present invention comprise component (c) in an amount ranging from about 200 to about 500 parts per million metal based on the total silicone weight.

The metallic stabilizers (c) of the present invention can be added to the pressure sensitive adhesives of the present invention in a variety of forms, as long as they are oil- or organic-soluble, stable in the silicone composition before use and are not prohibitive of silicone curing.

Examples of suitable metals are the rare earth metals, e.g. lanthanum, cerium, praesodymium, neodymium, promethium, samarium, europium, gadolinium, terbium, dysprosium, holmium, erbium, thulium, ytterbium and lutetium. Other useful metals are various transition metals, including but not limited to zirconium, titanium, nickel, iron, vanadium, chromium, maganese, cobalt, copper etc. Still other useful metals may include magnesium, calcium, barium, aluminum and tin. It is also contemplated that combinations, i.e. blends, mixtures, complexes or alloys, of any of the above metals may also be employed. Typically, the oil or organic soluble metal salt compounds useful in the practice of the present invention comprise a rare earth metal salt of a carboxylic acid having from about 2 to about 18 carbon atoms. For example, these can include carboxylates, octoates, naphthenates, stearates and tallates. Preferred are compounds such as a rare earth metal carboxylates, including but not limited to cerium 2-ethylhexanoate.

Metal carboxylates in organic solvents can be obtained commercially from Mooney Chemicals, e.g., or prepared by reacting the metal or metals of choice with carboxylic acid and diluted in a solvent such as mineral spirits. Also, other metal carboxylates can be prepared by reacting the desired metal or metals with other carboxylic acids, such as acetic acid, propionic acid, 2-ethylhexonic acid, neodecanoic acid or naphthenic acid.

Typically, the metal carboxylate salt used in the compositions of the present invention are in the form of a 20 percent to 65 percent solution, of which from 6 to 8 percent comprises the active metal. The volatile solvents are primarily selected from the group consisting of hydrocarbon solvents such as, e.g., mineral spirits, ether solvents such as, e.g., diethylglycol monobutyl ether and 2-ethylhexoic acid. Examples of other suitable solvents for metal carboxylate salts include, but are not limited to, carboxylic acids of from 2 to about 18 carbon atoms, aliphatic hydrocarbon solvents such as hexane and heptane; aromatic hydrocarbon solvents such as toluene and xylene; glycol ether; and ketones.

The pressure sensitive adhesive of the present invention are generally prepared by first mixing together components (a) and (b) in their desired proportions. This may be accomplished by any suitable means but in general it is preferable to employ a mutual solvent, such as an aromatic or aliphatic hydrocarbon solvent.

The rare earth metal salt is added slowly to the mixture of components (a) and (b) with agitation in order to get a good dispersion. Poor dissolution or dispersion of the metal salts in the silicone composition can detract from the improved high temperature stability properties. The mixture is then blended until a uniform, homogeneous mixture is formed. They can be mixed using any of the techniques known to those skilled in the art, such a milling, blending, stirring and the like, either in batch or in continuous processes.

As soon as the ingredients are mixed, the composition is ready for use as a pressure-sensitive adhesive without further treatment. It is simply applied by any suitable means to the surfaces to be adhered, and the surfaces are then brought together. If the adhesive is in solvent, it is best to allow the solvent to evaporate before adhering the surfaces.

Application of the adhesive to the substrate surfaces can be accomplished by a wide variety of methods, including, but not limited to, brushing, roller coating, knife-over-roll, drawn-down using a blade coater or spraying the solution on the surface.

If desired, the coating may be cured for a short time before use, e.g. at 160°–177° C. for from about 1 to about 4 minutes. Likewise, one may if desired, employ a catalyst to assist in the curing. Examples of suitable catalysts include any of the well-known silicone curing catalysts, such as, for example, benzoyl peroxide, dichlorobenzoyl peroxide, and di-t-butyl peroxide and azo compounds, e.g., azo-bis-isobutyronitrile; silanol-condensing catalysts, e.g., salts of heavy metals, such as dibutyltin diacetate and stannous octoate; hydrosilation catalysts, e.g. platinum-containing catalysts, such a chloroplatinic acid and platinum on charcoal; and lead, zinc or tin naphthenates.

The amount of adhesive material which is applied to surfaces may be varied to fit particular circumstances. Ordinarily, sufficient adhesive should be applied to render the surface definitely tacky to the touch after the removal of any solvent. After applying it to the surface, the adhesive may be cured by air drying or by heating at temperatures ranging up to about 550° F. Heating will hasten removal of the solvent and also tends to increase the cohesive strength of the adhesive film. After curing, the surfaces to be adhered are brought together. No further curing is needed in order to establish a firm bond between the surfaces.

Small amounts of additional ingredients can be added to the compositions of the present invention if desired. For example, antioxidants, pigments, stabilizers, fillers and the like, can be added as long as they do not materially deteriorate the pressure sensitive adhesive properties of the composition.

The compositions of the present invention are excellent pressure sensitive adhesives which also have excellent high temperature stability. They will readily stick to a wide variety of support substrates, whether flexible or rigid. Typically, useful support substrates include, but are not limited to metals such as aluminum, silver, copper, iron and their alloys; porous materials such as paper, wood, leather, and fabrics; Kapton®, organic polymeric materials such as polyolefins, such as polyethylene and polypropylene, fluorocarbon polymers such as polytetrafluoroethylene and polyvinylfluoride, silicone elastomers, silicone resins, polystyrene, polyamides such as nylon, polyesters and acrylic polymers; painted surfaces; siliceous materials such as concrete, bricks, cinderblocks and glass such as glass cloth, etc. These and other substrates, as known to those of ordinary skill in the art, may be employed for use with the pressure sensitive adhesives of the present invention.

It is further contemplated by the present invention that a primer be applied to the substrate surface to prevent legging and webbing problems. A primer which can be used in this invention is SS4191 primer, available from General Electric Company. The SS4191 primer is a toluene solution of a curable dimethyl polysiloxane having a viscosity of 10,000–18,000 centipoise at 25° C. The solids content of the primer is about 29–31 percent. The SS4191 primer is normally used at a bath concentration of 3–10 percent solids. The SS4191 primer can be used in combination with a catalyst, i.e., SS4192c catalyst, available from General Electric Company, and an accelerator, i.e. SS4259c accelerator, also available from General Electric Company. The SS4192c catalyst is a 50% solution of dibutyl tin diacetate. The SS4259c accelerator is a toluene solution of methyl-2-methylaminoethoxy polysiloxane chain-stopped with trimethylsiloxy groups.

The SS4191 primer system contains 10 parts by weight of SS4191 primer, 0.5 parts by weight of SS4192c catalyst, 0.5 parts by weight of SS4259c accelerator, 72 parts by weight of toluene and 18 parts by weight of hexane. The system is prepared by diluting the SS4191 primer with the toluene and hexane prior to the addition of the catalyst system and accelerator. The ingredients are then mixed thoroughly. The primer composition is applied to the substrate and cured for 30 seconds at 115° C.

It is noted that other primer compositions can be employed within the scope of the present invention.

The primer can be applied to the substrate by conventional methods well-known in the art, e.g., spraying, roll coating, dip coating, brushing, and other art-recognized techniques.

Useful articles which can be prepared with the pressure sensitive adhesives of the present invention include pressure-sensitive adhesive tapes, labels, emblems and other decorative or informative signs, etc.

DESCRIPTION OF THE PREFERRED EMBODIMENTS

The following examples illustrate the present invention. They are not to be construed to limit the scope of the appended claims in any manner whatsoever.

EXAMPLES 1 TO 3

About 300 parts per million of rare earth metals were incorporated into either of two silicone pressure sensitive adhesives, PSA-1 and PSA-2.

PSA-1 is a 55% solids in xylene silicone pressure sensitive adhesive prepared by agitating a mixture of 51.3 parts MQ resin, 24.2 parts dimethylsiloxane gum, 24.5 parts xylene and 0.014 parts 10% NaOH in water until a homogeneous solution is obtained. The mixture is then heated to reflux and cooked at reflux for 2 hours. After the cooking step, all of the water was trapped off, and the mixture was cooled. The solids content was then adjusted to 56% with xylene and the mixture was neutralized to 0–15 ppm acid with 10% $H_3PO_4$.

PSA-2 is a 60% solids in toluene silicone pressure sensitive adhesive prepared by agitating a mixture of 40.6 parts MQ resin, 21.5 parts dimethylsiloxane gum, 14.3 parts toluene and 0.02 parts 10% NaOH in water until a homogeneous solution is obtained. The mixture is then heated to reflux and cooked at reflux for 2 hours. After the cooking step, all of the after was trapped off, and the mixture was cooled. The solids content was then adjusted to 60% with toluene and the mixture was neutralized to 0–15 ppm acid with 10% $H_3PO_4$.

Rare earth octoate solution in hydrocarbon solvent, obtained commercially from Interstab (AKZO Chemmie), is added to the respective silicone composition. The composition was then coated on a 1 mil polyimide film which was primed with SS4191 primer system (General Electric Company) to about 1.5 to 2 mils. The adhesive was cured for 3 minutes at 175° C., after a 30 second solvent flashing. Peel adhesion against steel plate and probe tack adhesion were measured. The elevated temperature stability was investigated by exposing the cured adhesive in a 550° F. air circulating furnace for 72 hours. The exposed tapes were examined for delamination from backing, cracking and edge curling.

The metal stabilizer is varied in additional examples. The results, along with compositional data, are set forth below in Table 1.

TABLE 1

| Example | 1 | 1A* | 2 | 2A* | 3 |
|---|---|---|---|---|---|
| Composition | | | | | |
| PSA-1[a] | X | X | — | — | — |
| PSA-2[b] | — | — | X | X | X |
| Rare Earth[c], ppm | 300 | 50 | 300 | 50 | — |
| Cerium[d] | — | — | — | — | 300 |
| Properties | | | | | |
| Peel, oz/in | 27 | 28 | 28 | 28 | 30 |
| Tack, g/cm$^2$ | 482 | 548 | 662 | 688 | 658 |
| 550° F. aging | Pass | Fail | Pass | Fail | Pass |

\* = Comparative Example
[a] = Silicone Pressure Sensitive Adhesive
[b] = Silicone Pressure Sensitive Adhesive
[c] = Rare earth metals in hydrocarbon solvent from Interstab (AKZO Chemmie)
[d] = Cerium metal salt from Mooney Chemical Company As can be seen from Table 1 above, silicone pressure sensitive adhesives comprising the metal stabilizers in accordance with the appended claims exhibit improved high temperature stability over the silicone pressure sensitive adhesives of the prior art.

EXAMPLES 4 TO 5

The procedure of Example 1 is followed except that the effectiveness of other metals, in the form of metal carboxylate salts are tested. The adhesives are further incorporated with 0.55 g of benzoyl peroxide curing agent. The results, along with compositional data, are set forth below in Table 2.

TABLE 2

| Example | 4 | 4A* | 5 | 5A* |
|---|---|---|---|---|
| Composition | | | | |
| PSA-1[a], gm | 50 | 50 | 50 | 50 |
| Magnesium, ppm | 300[b] | — | — | 110[c] |
| Zinc[d], ppm | — | 360 | — | — |
| Zirconium[e], ppm | — | — | 300 | — |
| Properties | | | | |

TABLE 2-continued

| Example | 4 | 4A* | 5 | 5A* |
|---|---|---|---|---|
| Peel, oz/in | 30 | 29 | 30 | 30 |
| Tack, g/cm$^2$ | 750 | 644 | 620 | 748 |
| 550° F. aging | Pass | Fail | Pass | Fail |

\* = Comparative Example
[a] = Silicone Pressure Sensitive Adhesive
[b] = 0.42 g of 2% Magnesium Ten-Cem, Mooney Chemical Company
[c] = 0.155 g of 2% Magnesium Ten-Cem, Mooney Chemical Company
[d] = 0.124 g of 8% Zinc Hex-Cem, Mooney Chemical Company
[e] = 0.137 g of 6% Zirconium Hex-Cem, Mooney Chemical Company

EXAMPLES 6 TO 10

The procedures of Examples 1-5 were followed to test various metal stabilizing systems. The adhesives were further incorporated with 0.55 g of benzoyl peroxide. The adhesive films were prepared as described in Example 1 and cured for 3 hours at 200° C., after a 90 second flash at 70° C. The cured films were then tested for heat stability for 72 hours at 550° F. The results, along with compositional data, are set forth below in Table 3.

TABLE 3

| Example | 6 | 7 | 8 | 9 | 10 |
|---|---|---|---|---|---|
| Composition | | | | | |
| PSA - 1[a], gm | 50 | 50 | 50 | 50 | 50 |
| Cerium, ppm | 160[b] | 160[b] | 160[b] | 240[c] | 286[d] |
| Magnesium, ppm | 60[e] | — | 100[f] | — | — |
| Zinc, ppm | — | 100[g] | — | 160[h] | 114[i] |
| Properties | | | | | |
| 550° F. aging | Pass | Pass | Pass | Pass | Pass |

[a] = Silicone Pressure Sensitive Adhesive
[b] = 0.075 g of 6% Cerium Hex-Cem, Mooney Chemical Company
[c] = 0.110 g of 6% Cerium Hex-Cem, Mooney Chemical Company
[d] = 0.130 g of 6% Cerium Hex-Cem, Mooney Chemical Company
[e] = 0.078 g of 2% Magnesium Ten-Cem, Mooney Chemical Company
[f] = 0.138 g of 2% Magnesium Ten-Cem, Mooney Chemical Company
[g] = 0.0344 g of 8% Zinc Hex-Cem, Mooney Chemical Company
[h] = 0.055 g of 8% Zinc Hex-Cem, Mooney Chemical Company
[i] = 0.0392 g of 8% Zinc Hex-Cem, Mooney Chemical Company Table 3 above demonstrates that combinations of other metal salts with cerium metal salts provide improved high temperature stability adhesives.

EXAMPLES 11 TO 12

The use of the metal salts to improve elevated temperature stability was further tested in silicone pressure sensitive adhesives based on platinum-catalyzed addition cure of a high solids vinyl- and methylhydrogen-containing silicones. The compositions contain two components, PSA-Vi and PSA-MeH.

The PSA-Vi component is a silicone pressure sensitive adhesive containing 94% solids in 6% toluene. The adhesive composition solids comprise 58% of an MQ resin and 52% of a vinyl terminated fluid containing 105 D units. The composition further comprises 60 ppm platinum catalyst.

The PSA-MeH component is also a silicone pressure sensitive adhesive composition containing 94% solids in 6% toluene. The adhesive composition solids comprise 58% of MQ resin and 42% of a mixture containing 80 mol % hydride terminate fluid containing 121 D units and 20 mol % of a hydride crosslinker having an HEW (hydrogen equivalent weight) of 625.

The components are then further mixed with a crosslinker having the general formula $MD_{20}D^H_3M$ having an HEW of 625.

The appropriate metals are added to the adhesive and the adhesive composition is then coated over an SS4331 primed (A silicone primer system, available from General Electric Company, containing 13.3 parts of SS4331 polydimethylsiloxane solution, 0.25 parts of SS8010 platinum-containing catalyst solution, 0.14 parts of SS4300C methylhydrogen silicone crosslinker, and 76 parts of hexane solvent) 1 mil polyimide film and cured 3 minutes at 150° C. for high temperature exposure. The adhesive properties are reported on 1 mil polyester film backing. The results, along with composition data are set forth below in Table 4.

TABLE 4

| Examples | 11 | 11A* | 12 |
| --- | --- | --- | --- |
| Composition | | | |
| PSA-Vi$^a$ | 10 | 10 | 10 |
| PSA-MeH$^b$ | 9.51 | 9.51 | 9.51 |
| Crosslinker$^c$ | 0.18 | 0.18 | 0.18 |
| Stabilizer, ppm | 300$^d$ | 50$^e$ | 300$^f$ |
| Properties | | | |
| Peel, oz/in | 25 | 30 | 26 |
| Tack, g/cm$^2$ | 642 | 642 | 658 |
| 550°F. aging | Pass | Fail | Pass |

\* = Comparative Example
$^a$ = Silicone Pressure Sensitive Adhesive
$^b$ = Silicone Pressure Sensitive Adhesive
$^c$ = MD D$^H$M crosslinker
$^d$ = 0.585 g of 6% rare earth octoate, Interstab (AKZO Chemmie)
$^e$ = 0.0152 g of 6% rare earth octoate, Interstab (AKZO Chemmie)
$^f$ = 0.0585 g of 6% cerium Hex-Cem, Mooney Chemical Company Table 4 above demonstrates that adhesives exhibiting improved high temperature stability can be prepared from adhesives containing high solids vinyl and hydrogen stopped fluids.

The above-mentioned patents are hereby incorporated by reference.

Many variations of the present invention will suggest themselves to those of ordinary skill in the art in light of the above-detailed description. All such obvious modifications are within the full intended scope of the appended claims.

We claim:

1. An article of manufacture comprising a silicone pressure sensitive adhesive comprising
   (a) an aromatic hydrocarbon soluble resin copolymer comprising $R_3SiO_{1/2}$ units and $SiO_{4/2}$ units where each R individually represents a monovalent hydrocarbon radical containing no more than six carbon atoms, there being from about 0.6 to about 0.9 $R_3SiO_{1/2}$ units for every $SiO_{4/2}$ unit;
   (b) a hydroxyl, vinyl or hydride end-stopped diorganopolysiloxane; and
   (c) from about 200 to about 500 parts per million metal of oil or organic soluble metal salts based on the total silicone weight of (a) and (b).

\* \* \* \* \*